Figure 1:
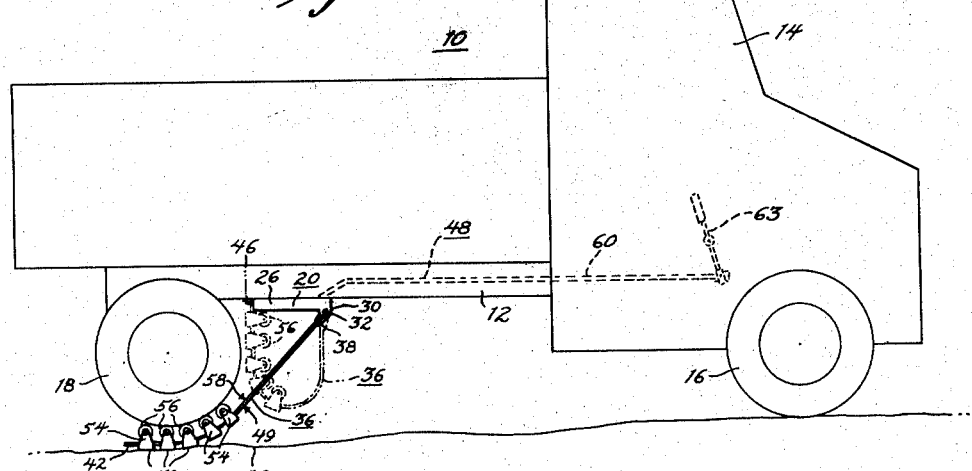

May 19, 1959     T. L. SNEE     2,887,184

VEHICLE BRAKING DEVICE

Filed March 2, 1956

INVENTOR.
THOMAS L. SNEE
BY Jacob Trachtman
ATTORNEY.

United States Patent Office 2,887,184
Patented May 19, 1959

2,887,184
VEHICLE BRAKING DEVICE
Thomas L. Snee, Wilkes-Barre, Pa.

Application March 2, 1956, Serial No. 569,144

1 Claim. (Cl. 188—4)

The invention relates to vehicle braking devices and more particularly to a vehicle braking device utilizing means for engaging the surface of a road or vehicle bearing surface.

Nowadays, many accidents occur especially in connection with load carrying vehicles such as trucks due to the failure of their conventional braking systems. In the case of such failure, the vehicle runs out of control and in many instances results in loss of lives and property.

It is, therefore, a primary object of this invention to provide a new and improved vehicle braking device of high reliability and great effectiveness under adverse conditions.

Another object of the invention is to provide a new and improved vehicle braking device which may be used in addition to the conventional braking means for emergency purposes.

Another object of the invention is to provide a new and improved vehicle braking device which will safely and effectively halt the forward motion of a vehicle of great weight within a short period of time upon the failure of the conventional braking system.

Another object of the invention is to provide a new and improved vehicle braking device especially adapted for trucks and heavy vehicles and trailers and which may be easily installed for auxiliary use.

Another object of the invention is to provide a new and improved vehicle braking device providing operative portions of great durability which may be easily replaced when worn with a new operative member.

Another object of the invention is to provide a new and improved vehicle braking device which is easily manufactured, and low in cost.

Another object of the invention is to provide a new and improved vehicle braking device particularly adapted for auxiliary emergency use.

The above objects as well as many other objects are achieved by providing a vehicle braking device comprising a flexible band member having a first end adapted for extending athwart and being secured with the vehicle body at a location preceding a pair of its rear wheels and a second end portion adapted for being releasably secured proximate the first end of the band member. The second end portion of the member when released is adapted for receipt between the wheels of the vehicle and the vehicle bearing surface under the wheels.

The second end portion of the member may be provided with a plurality of gripping bars secured across the bottom surface of the second end portion, and a plurality of wheel engaging rollers pivotally supported by the gripping bars in a position above and extending across the top surface of the band member. When thus positioned, the rear wheels may continue to revolve without exerting any frictional force upon the second end of the band member, while the weight of the vehicle is transmitted by the rear wheels through the rollers to the bars for producing a high frictional force with the vehicle bearing surface for opposing the forward motion of the vehicle along the surface.

A release mechanism may be provided having a control handle in the cab of the vehicle for actuation by the operator. Upon failure of the conventional braking system, the operator by using the control handle may release the second end portion of the brake band. The band is then received under the rear wheels and produces a frictional force with the road or vehicle bearing surface. This brings the vehicle to a halt and prevents its run-away. Such auxiliary braking means is of great importance in connection with trucks, and truck cabs and trailers which because of their load may be especially hazardous when their conventional braking systems become defective.

Figure 2:
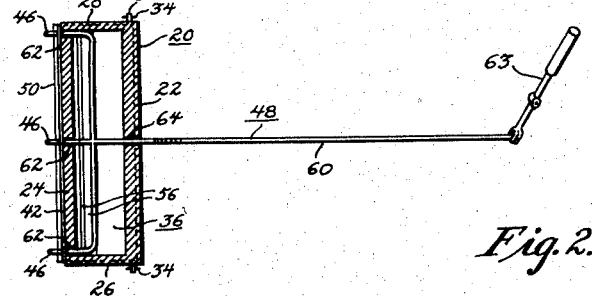
Figure 3:
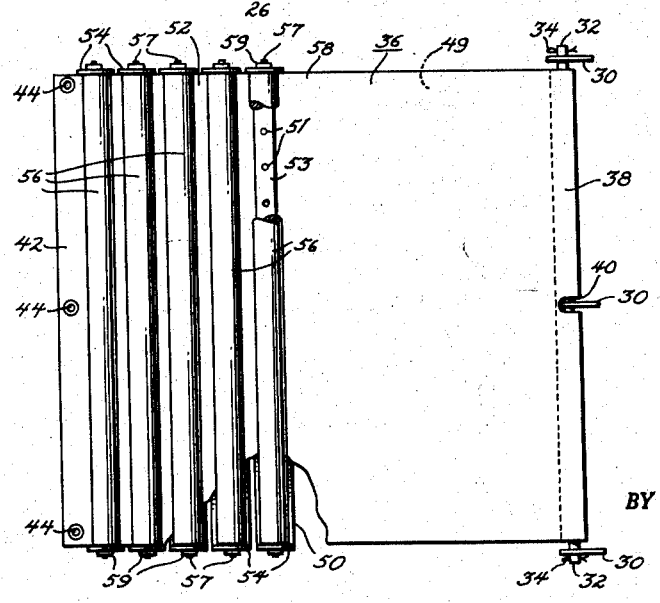

The foregoing and other objects of the invention will become more apparent as the following detailed description of the invention is read in conjunction with the drawings, in which:

Figure 1 is a side elevational view of a vehicle provided with a vehicle braking device embodying the invention, Figure 2 is a plan view of the brake band with its supporting structure and release control, and Figure 3 is an enlarged plan view of the vehicle braking band.

Like reference numerals designate like parts throughout the several views.

Refer to the figures which illustrate a vehicle 10 in the form of a truck provided with a body 12 having a cab 14 and carried by a pair of front wheels 16 and a pair of rear wheels 18.

A brake band supporting structure 20 is secured to the under carriage of the body 12 of vehicle 10 such as by welding, bolting or any other such method. The band supporting structure 20 is positioned proximate to and immediately preceding the rear wheels 18 of the vehicle 10.

The band supporting member 20 is substantially rectangular in configuration and extends athwart the body 12 of the vehicle 10. The member 20 has front and rear main portions 22 and 24, and right and left side portions 26, 28. Three brackets 30 each having an opening therethrough extend downwardly from the front portion 22 of the supporting structure 20 (see Figures 1 and 3). The brackets 30 are adapted to receive through their openings, a band retaining rod 32 which may be provided with retaining cotter pins 34 at its ends to allow rapid removal.

A brake band 36 (see Figure 3) has a first end 38 which is folded back to form a loop. The front end 38 is secured with the supporting structure 20 by receiving through its looped portion, the band retaining rod 32 which in turn is supported by the brackets 30. The opening 40 in the portion 38 of the brake band 36 is provided to accommodate the central supporting bracket 30 of the structure 20.

The brake band 36 is thus retained with its first end 38 athwart or extending across the body 12 of the vehicle 10.

The brake band 36 is preferably made of a flexible material having good wearing properties, high tensile strength and good frictional properties. Materials containing asbestos compositions have been found to have good frictional and temperature properties.

The brake band 36 is of sufficient width to extend across and between both of the rear wheels 18 and is of sufficient length so that its second end 42 will extend under the wheels 18 as shown in Figure 1.

The second end 42 of the band member 36 is provided with three reinforced openings 44 which are respectively adapted to receive the extending ends 46 of a retractable band control device or mechanism 48.

The brake band 36 may also be provided with a plurality of parallel bars 50 secured with and extending across the rear end portion 52 of the band 36. The bars 50 may be provided with upwardly extending end portions 54 which rotatably support a plurality of rollers 56 above and extending across the top surface 58 of the band 36, while the main portions of the bars 50 are secured along the bottom surface 49 of the band 36. The bars 50 may be supported with the band 36 by utilizing a pressure plate 53 and rivets 51, or by bolting, and other conventional methods.

The control mechanism which releasably secures the second end 42 of band 36 comprises a forked end with extensions 46 which are extended and retracted by the action of a communicating rod 60. The forward end of the rod 60 is connected with a pivoted control handle 63 positioned in the cab 14 of the vehicle 10 for actuation by the operator.

Normally the brake band 36 is positioned with its front and rear ends 38 and 42 secured respectively with the supporting structure 20 and releasing mechanism 48 to form the loop shown by the dashed lines in the Figure 1. The extending ends 46 of the control mechanism 48 may be slightly inclined upwardly from the horizontal position to prevent accidental release of the brake band 36. The forked end of the control mechanism is positioned and aligned for action by the openings 62 and 64 in the supporting structure 20. The Figure 2 illustrates the supporting structure 20 with its control mechanism 48 in the extended position securing the brake band 36 in the looped position ready for its release.

When the braking device is to be applied, the handle 63 of the control mechanism 48 is drawn back as shown in Figure 1. This releases the second end 42 of the brake band 36 by withdrawing into the supporting structure 20 the extending ends 46 of its forked portion.

The second end portion 52 of the brake band 36 drops downwardly and is received under the rear wheels 18 of the vehicle 10. In this position, the portion 52 is between the rear wheels 18 and the road or vehicle bearing surface 66. The rear wheels 18 may continue to turn without exerting a frictional force upon the brake band 36. This results from the action of the rollers 56 on which the wheels 18 turn. Weight of the vehicle 18 is however transmitted by the wheels 18, by contact of the rollers 56, to the bars 50 which frictionally engage the road or vehicle bearing surface 66. The weight force thus applied is important because it is directed substantially normal to the movement of the bars 50 over the vehicle bearing surface 66 and is a direct factor of the frictional force produced between the bars 50 and the vehicle bearing surface 66. The frictional force produced opposes the forward motion of the vehicle along the surface 66 and effectively brings the vehicle to a halt.

Although the brake band 36 is illustrated with the bars 50 and rollers 56, it will also function satisfactorily without them. In this case a frictional force will also be produced between the wheels 18 and the band member 36 tending to stop their rotation. Such action may increase the wear on the tires of the wheels 18 and the brake band 36, but still provides an effective vehicle braking system.

When the vehicle has been brought to a halt by the release and application of the brake band member 36, the end portion 52 of the brake band 36 may be removed from under the wheels 18 by rearward motion of the vehicle 10 or by jacking up the rear end of the vehicle 10. The rear end 42 of the band member 36 may then again be attached to the extending end portions 46 of the band release mechanism in its extended position. This prepares the band 36 for another release and braking action.

In this manner, the vehicle braking device may be repositioned after every application, thereby, setting it for another emergency use.

The band brake member 36 may easily be replaced should it become worn. This is done by the removal of the retaining rod 32 which is reinserted through the looped end portion 38 of the new brake member 36.

It is noted that the operation of this device is simple and its efficiency and effectiveness does not decrease with the weight of the vehicle 10 to which it is applied because of the application of the vehicle weight to the vehicle brake band 36 for braking action.

It will be obvious to those skilled in the art that the invention may find wide application with appropriate modification to meet the individual design circumstances, but without substantial departure from the essence of the invention.

What is claimed is:

A vehicle comprising a body with pairs of front and rear wheels adapted for movement over a vehicle bearing surface; a band supporting structure connected under and athwart said body approximate and preceding said pair of rear wheels; a retractable band release mechanism having a band engaging portion including a plurality of retractable rearwardly extending ends positioned proximate said band supporting structure and a control portion in the cab of said vehicle; and a unitary continuously flexible and pliant substantially homogeneous non-metallic band member of high tensile strength and good frictional properties having a first end adapted for extending athwart said vehicle and secured with said supporting structure, and a second end portion conditionally being looped and secured with said release mechanism between its first end and said wheels by having a plurality of openings for receiving the retractable ends of said mechanism when in its extended position and being released when said ends are retracted; the second end portion of said member when released being adapted for receipt between said rear wheels and the vehicle bearing surface under said wheels; the second end portion of said member being provided with a plurality of gripping bars secured across the bottom surface of its second end portion each providing a pair of vertical end brackets, and a plurality of wheel engaging rollers each having a continuous cylindrical surface extending between and pivotally supported by respective end brackets of said gripping bars in position above and extending across the top surface of said band member; weight of said vehicle being transmitted by said rollers to said bars for producing a frictional force with said vehicle bearing surface opposing forward motion of said vehicle along said surface.

References Cited in the file of this patent

UNITED STATES PATENTS

| | | |
|---|---|---|
| 944,603 | Eigenmann | Dec. 28, 1909 |
| 1,401,350 | Monahan | Dec. 27, 1921 |
| 2,191,954 | Buffa | Feb. 27, 1940 |
| 2,224,785 | Greene | Dec. 10, 1940 |
| 2,344,148 | Jackson | Mar. 14, 1944 |
| 2,726,736 | Dankovich | Dec. 13, 1955 |
| 2,732,035 | Besoyan | Jan. 24, 1956 |
| 2,746,570 | Stahmer | May 22, 1956 |

FOREIGN PATENTS

| | | |
|---|---|---|
| 979,707 | France | Dec. 13, 1950 |